Patented Apr. 15, 1924.

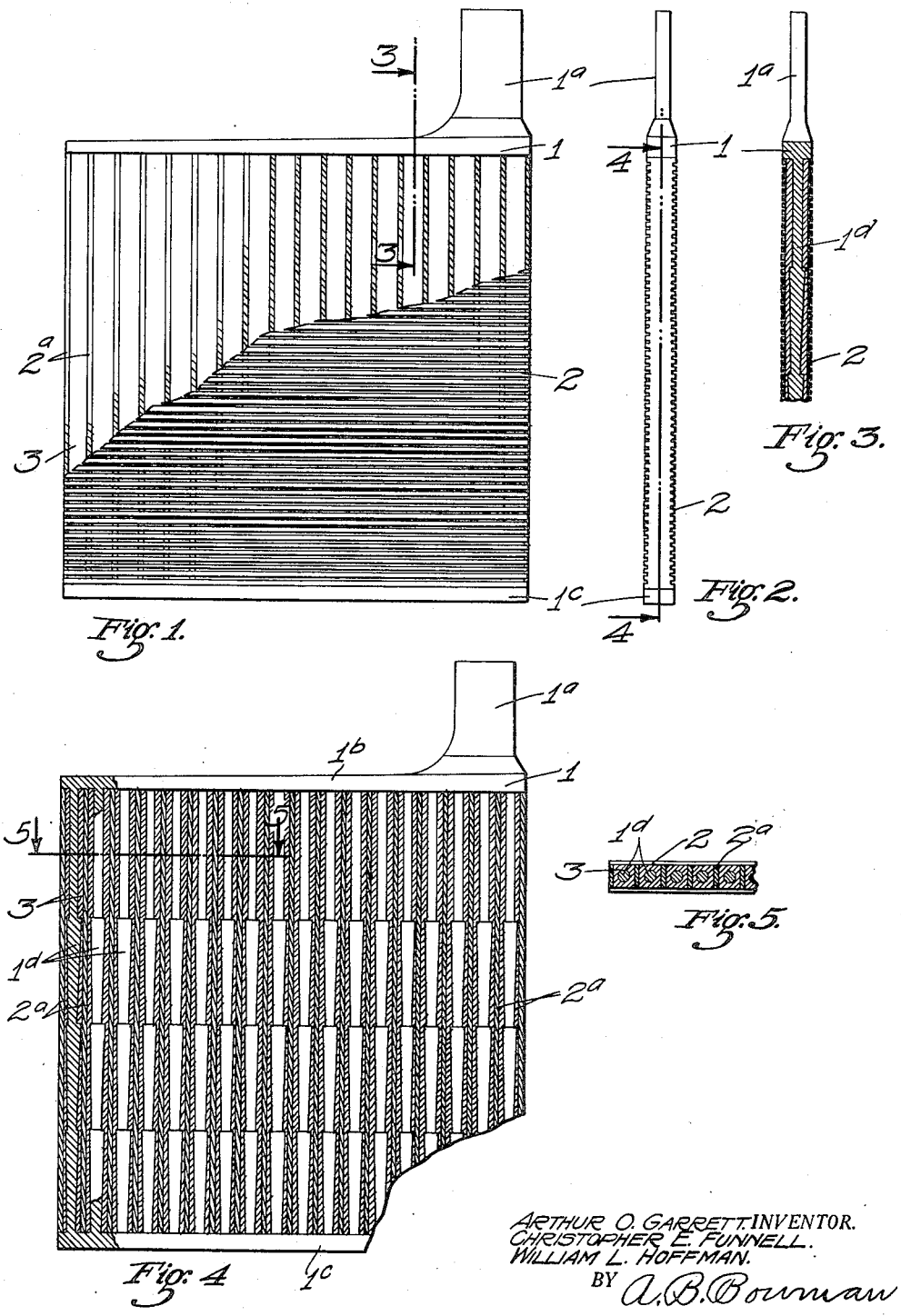

1,490,319

UNITED STATES PATENT OFFICE.

ARTHUR O. GARRETT, OF SAN DIEGO, AND CHRISTOPHER E. FUNNELL AND WILLIAM L. HOFFMAN, OF LOS ANGELES, CALIFORNIA; SAID GARRETT AND SAID FUNNELL ASSIGNORS TO SAID HOFFMAN.

STORAGE-BATTERY PLATE.

Application filed December 17, 1920. Serial No. 431,431.

*To all whom it may concern:*

Be it known that we, ARTHUR O. GARRETT and CHRISTOPHER E. FUNNELL and WILLIAM L. HOFFMAN, citizens of the United States, residing at San Diego, Los Angeles, and Los Angeles, respectively, in the counties of San Diego, Los Angeles, and Los Angeles, respectively, in the State of California, have invented a certain new and useful Storage-Battery Plate, of which the following is a specification.

Our invention relates to storage battery plates more particularly for use in connection with battery cells used for heavy duty purposes and the objects of our invention are: first, to provide a novelly constructed storage battery plate; second, to provide a storage battery plate with a non-conductor covering which performs the functions of a support for the active material; third, to provide a storage battery plate of this class in which a positive and separate conductivity is provided through each of the vertical tubes of the retainer which holds the active material; fourth, to provide a plate of this class in which the grid, which is composed of a plurality of vertical lead members, is incased in a non-conducting hard rubber retainer with vertical cells for supporting the active material; fifth, to provide a plate which consists of a grid with a non-conducting receptacle to receive the same and sixth, to provide a plate of this class which is simple and economical of construction, very durable, is not liable to warp, twist or get out of order and which will not readily deteriorate.

With these and other objects in view as will appear hereinafter our invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of our plate showing a portion of the side wall broken away and showing the active material positioned in the vertical cells of the retainer; Fig. 2 is an edge view of the plate complete; Fig. 3 is a fragmentary sectional view through 3—3 of Fig. 1; Fig. 4 is a sectional view through 4—4 of Fig. 2 and Fig. 5 is a fragmentary sectional view through 5—5 of Fig. 4.

Similar characters of reference refer to similar parts and portions throughout the several views of the drawings.

The grid 1, retainer 2 and active material 3 constitute the principal parts and portions of our battery plate.

The grid 1 is composed of lead with the proper amount of alloy hardening and consists of a post $1^a$, upper horizontal member $1^b$, lower horizontal member $1^c$ and a plurality of vertical connecting members $1^d$. The post $1^a$ and the support $1^b$ are of the ordinary or conventional type, the member $1^b$ tapering gradually from the post outwardly. The members $1^d$, however, consist of a plurality of spaced apart members made in separate tapering portions provided with shoulders, as shown best in Fig. 4 of the drawings, and these members $1^d$ are inserted in cells formed by the vertical strips $2^a$ which are normally vertical cells in the hard rubber retainer 2. These hard rubber retainers are also provided on each side with a plurality of slots through the wall of said retainer, thus permitting access of the electrolyte to the active material through the walls of the retainer, and the space around the members $1^d$ in the cells is filled with active material.

It is preferred to construct the plate as follows: After the grid members are inserted in the perforate hard rubber retainer, as shown in Fig. 4 of the drawings, the grid and retainer are then held with the bottom side up and the active material is shaken down into the different openings into the retainer $2^a$ which surrounds the various members of the lead grid, then the bottom member $1^c$ of the grid is cast in position by means of a torch by setting a form around the retainer at the bottom, extending three-sixteenths of an inch past the bottom edge which is filled with melted lead which connect with the extended ends of the members $1^c$ and become an integral portion thereof, The active material is used dry when filling, after which it is chemically treated and formed. This process hardens the active material which is bound around the lead grid portions 1ᵈ, the active material being additionally supported by means of the shoulders on said members 1ᵈ.

Though we have shown and described a particular construction, combination and arrangement of parts and portions we do not wish to be limited to this particular construction, combination and arrangement but desire to include in the purview of our invention the construction, combination and arrangement substantially as set forth in the appended claims.

It is obvious that with this construction, there is provided a storage battery plate for heavy duty purposes in which the active material is supported in a casing with perforate sides for permitting the entrance of the electrolyte and the percipitation of the inactive material; that the casing will thus support the active material and also provides against shortening between the plates and provides for rapid conductivity of the current.

Having thus described our invention what we claim as new and desire to secure by Letters Patent is:

1. In a plate for storage batteries, a grid member consisting of spaced top and bottom members and a plurality of single, vertical, tie members, each consisting of a plurality of tapered sections with shoulders at the end of each tapered section.

2. In a storage battery plate, a nonconducting, impervious substance casing provided with a plurality of spaced, single, cross partitions and provided with horizontally slotted sides.

3. In a storage battery plate, a nonconducting, impervious substance casing provided with a plurality of spaced, single cross partitions and provided with horizontally slotted sides, and a grid member with vertical, active, material supports positioned between said partitions in said casing.

In testimony whereof we have hereunto set our hands at Los Angeles, California, this 30th day of November, 1920.

ARTHUR O. GARRETT.
CHRISTOPHER E. FUNNELL.
WILLIAM L. HOFFMAN.